United States Patent [19]

Ferraro

[11] Patent Number: 4,556,228
[45] Date of Patent: Dec. 3, 1985

[54] JAW LOCKING MECHANISM FOR LATHE CHUCKS HAVING A SOFT JAW, A MASTER JAW AND A KEY BLOCK

[75] Inventor: Thomas A. Ferraro, Hatfield, Pa.

[73] Assignee: Lock Jaws, Inc., Conshohocken, Pa.

[21] Appl. No.: 672,661

[22] Filed: Nov. 19, 1984

[51] Int. Cl.[4] .......................... B23B 31/10; B23B 31/16
[52] U.S. Cl. ..................................... 279/1 SJ; 279/123
[58] Field of Search ..................... 279/1 A, 1 SJ, 110, 279/123

[56] References Cited

U.S. PATENT DOCUMENTS 3,679,221 7/1972 Behrens .............................. 279/1 SJ
3,833,232 9/1974 Behrens ................................ 279/123

Primary Examiner—Fred Silverberg
Attorney, Agent, or Firm—Joseph W. Molasky & Assocs.

[57] ABSTRACT

To firmly retain the jaw of a lathe chuck against movement it is formed with a transverse slot in its bottom, a key-like block is inserted in the slot and has a pair of leg members arranged to bear on the chuck face, and a screw member is threadedly mounted in the jaw directly above the block so that it will bear on the block and force the leg members thereof against the chuck face.

8 Claims, 5 Drawing Figures

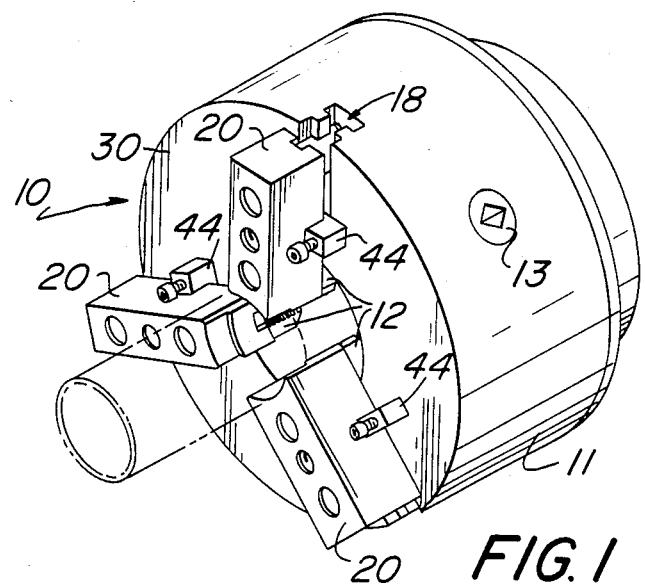
FIG. 1
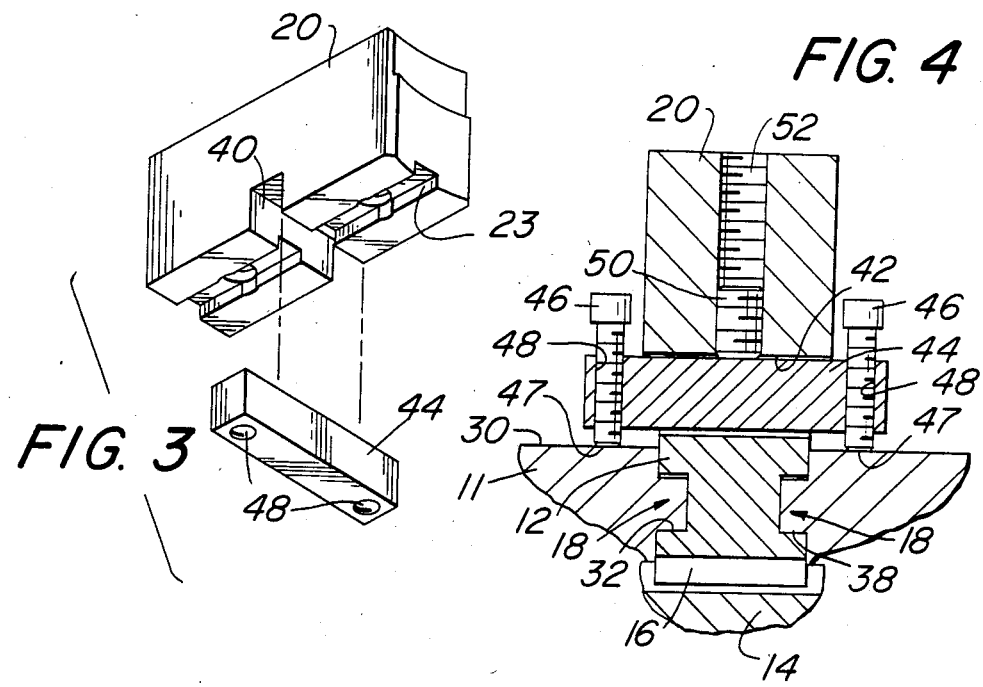
FIG. 3
FIG. 4

JAW LOCKING MECHANISM FOR LATHE CHUCKS HAVING A SOFT JAW, A MASTER JAW AND A KEY BLOCK

This application relates to application Ser. No. 398,106, filed July 14, 1982 and application Ser. No. 612,257 filed May 21, 1984.

BACKGROUND AND SUMMARY OF THE INVENTION

This invention relates to chucks for holding work pieces in lathes or like work piece rotating machines and particularly to means for rigidly holding the jaws against movement.

To carry out the present day precision in lathe work it is essential that the jaw faces which bear against the work accurately define a circle which is in absolute axial alignment with the axis of the work piece. This can be achieved by individually adjusting the jaws radially back and forth until the work is positively positioned in its intended location, but this is a very time consuming and tedious task. The working time which is lost in such a procedure is totally inconsistent with high productivity.

Various short cuts have been devised to shorten the setup time to accurately position the work piece and one of these ways is to provide the jaws with so-called soft material which can relatively easily be machined. This soft material makes it possible to rotate the chuck on the lathe in a normal manner and machine the soft material to absolutely accurate concentricity to receive the work. However, even this has its limitations as the slight slack which exists between the operating parts of the chuck mechanism results in a more or less malpositioning of the jaws.

The present invention provides means for firmly holding the jaws in fixed positions relative to the chuck body so that its faces which are to receive and grip the work can be machined to the size which will accommodate the workpiece. Then when the workpiece is placed between the jaws and the jaws are tightened against the work, the workpiece is accurately positioned axially and it can be machined with absolute precision.

The time required to bring the jaws to this accurate position is minute compared to the time required to individually adjust the jaws. Moreover, the use of the jaw locking means of this invention requires significantly less time and produces greater accuracy of positioning the jaw faces than the other means which have been devised.

The means of this invention is an improvement on the arrangement disclosed in U.S. Pat. No. 3,679,221 which issued to A. J. Behrens on July 25, 1972. This patent shows an eccentric wheel 84 which is mounted on a transverse shaft 82 so that when the wheel is turned and wedged against the face of the chuck body the effect will be to wedge the jaw itself against motion. The structure of the patent has some utility but as the eccentric wheel has merely a camming action to hold the jaw in place, it is not fully satisfactory. The structure provided by the present invention is simple and inexpensive and serves to rigidly hold the jaws in position on the chuck body. The invention can be applied to the jaws of the aforesaid patent to take the place of the wedge wheel and in order to show a representative application of the invention this description and drawings illustrate this use. This makes it unnecessary to illustrate the internal mechanisms of the chuck since the patent can be referred to for this disclosure. For this reason the structure and wording of the patent are hereby incorporated herein by this reference.

In the Applicant's prior application Ser. No. 398,106, filed July 14, 1982 there is disclosed one arrangement for rigidly holding the jaws in position on the chuck body, this arrangement comprising a U-block mounted for movement in a transverse passageway in the soft jaw. In application Ser. No. 612,257, filed May 21, 1984 the applicant has shown another means for rigidly holding the jaws in position on the chuck body, this means comprising a straight block contained in a transverse passageway in the soft jaw and having a pair of untarely mounted leg members in the extended ends thereof for contacting the chuck face. In accordance with the present invention there is provided another means for rigidly holding the jaws in position on the chuck body.

Briefly stated, the present invention comprises an improvement in a lathe chuck having a master jaw guided for sliding movement relative to the chuck body in ways in the chuck body, and a soft jaw mounted on and secured to the master jaw for conjoint movement therewith as a unit, the master jaw and the soft jaw unit being mounted for movement across the face of the lathe chuck as the master jaw slides in the chuck ways, the chuck ways and the master jaw having opposed surface portions limiting movement of the master jaw toward the chuck face, the improvement comprising a slot formed in the bottom of the soft jaw extending transversely therethrough and means for frictionally locking the master jaw and the soft jaw unit in a fixed position relative to the chuck body including a block mounted in the transverse slot and having portions extending laterally from the sidewalls of the soft jaw and leg members extending from said extended portions of the block towards the chuck face for frictionally engaging the same at the ends of the leg members and actuating means for causing the ends of the leg members to come into frictional engagement with the chuck face and the soft jaw to move away from the chuck face to cause opposed surface portions of the master jaw and the ways to be frictionally engaged so that the master jaw and the soft unit is frictionally locked in a fixed position relative to the chuck body.

BRIEF DESCRIPTION OF THE DRAWINGS

The invention is illustrated in the accompanying drawings in which:

FIG. 1 is a perspective view of a lathe chuck to which an embodiment of the invention has been applied.

FIG. 3 is a perspective view showing the underside of the soft jaw shown in FIGS. 1 and 2.

FIG. 4 is a sectional view taken on line 4—4 of FIG. 2.

DETAILED DESCRIPTION OF THE PREFERRED EMBODIMENTS

Figure 2:
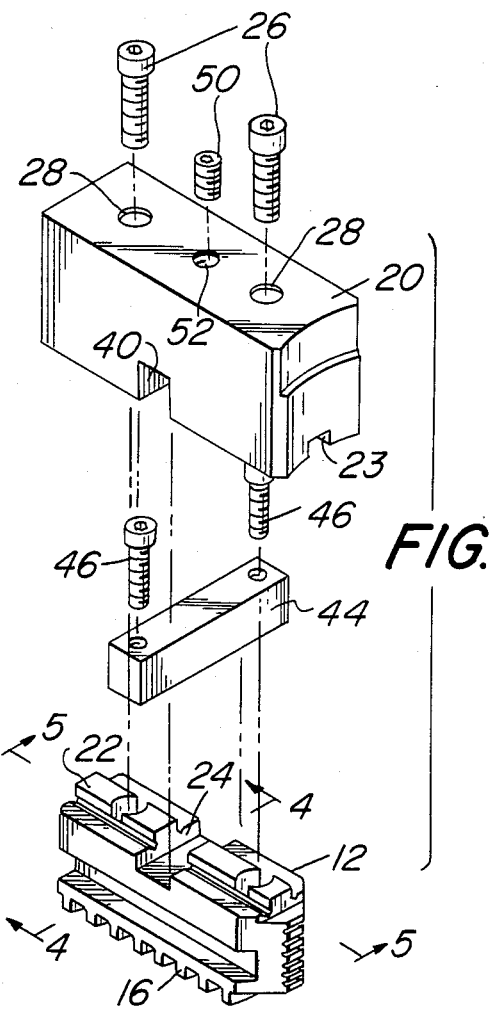
FIG. 2 is an exploded perspective view showing the master jaw and soft jaw of the embodiment shown in FIG. 1.

Referring to the drawings, there is shown a lathe chuck 10 which, along with its associated master jaws 12 (also known in the art as "hard jaws"), are constructed in the manner of the most common types of lathe chucks in use today. In this conventional construction, the operating mechanism for the lathe chuck 10 comprises a wrench engageable actuating means 13 which causes movement of a worm gear 14 which is threadedly engaged with worm teeth 16 on the bottom of the master jaws 12. Each of the master jaws 12 is guided for sliding movement relative to the chuck body 11 in ways 18 therein extending radially to the chuck axis. In the conventional use of the chuck 10, the actuating means 13 is operated to turn the worm gear 14 to cause the master jaws 12 to slide along the ways 18 radially of the chuck axis to set the master jaws 12 to a workpiece holding position. As shown in FIG. 4, the ways 18 have a pair of opposed key-like projections received in corresponding grooves in the master jaw 12.

Each of the master jaws 12 has an associated easily machinable soft jaw 20 mounted thereon and secured thereto for conjoint movement therewith as a unit. To this end, as is conventional, each master jaw 12 is provided on its top with a longitudinally extending key 22 which fits into a longitudinally extending keyway 23 in the bottom of the associated soft jaw 20, the function of this keyed arrangement being that the master jaw 12 and the soft jaw 20 are secured in a fixed position relative to one another along a first axis. The master jaw 12 is also provided on its top with a transversely extending keyway 24 adapted to receive a transversely extending key (to be described hereafter) on the bottom of soft jaw 20 so that the master jaw 12 and the soft jaw 20 are secured in a fixed position relative to one another along an axis that is perpendicular to said first axis thereof.

Figure 5:
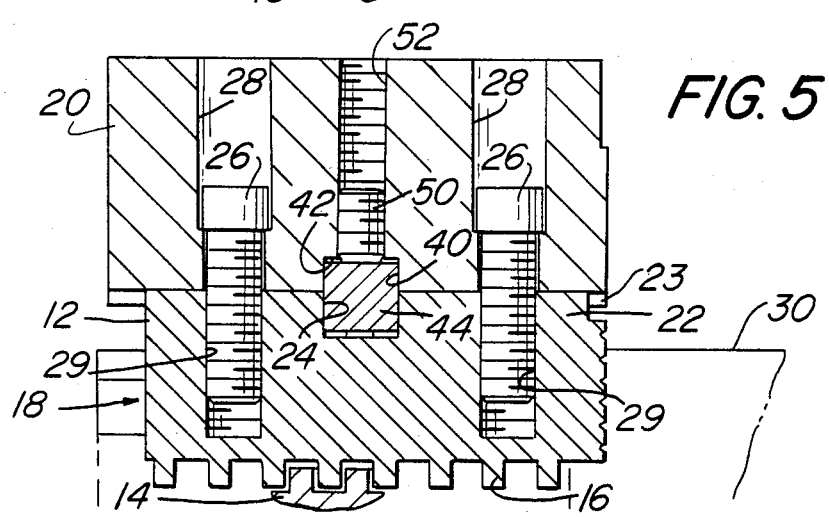
FIG. 5 is a sectional view taken on line 5—5 of FIG. 2.

A pair of threaded stud blots 26 are mounted in bores 28 in the soft jaw 20 and extend therethrough to threadedly engage the master jaw 12 in aligned threaded bores 29 to secure the master jaw 12 and soft jaw 20 firmly together as a unit, this engagement being shown in FIG. 5. The arrangement whereby the master jaw 12 and the soft jaw 20 are secured together in a fixed relationship by the use of the bolts 26 and cooperating keys and keyways is a typical construction well known in the art. By this construction, the master jaw 12 and the soft jaw 20 are mounted for movement across the face 30 of the lathe chuck 10 as the master jaw 12 slides in the ways 18 and is caused to move therealong by operation of the jaw setting means of the lathe chuck 10.

FIG. 4 illustrates that in an actual lathe chuck there is a certain amount of slack between the cooperating grooves in the master jaw 12 and the key projections in the ways 18 guiding the movement thereof. In FIG. 4 this slack is shown in an exaggerated dimension and it is to be understood that this slack is typically a very small amount. However, as stated above, this slack prevents machining the soft jaws 20 to absolute accurate concentricity and it is important that its deleterious effect be obviated. As is apparent from FIG. 4, the master jaw 12 and the ways 18 in the lathe chuck 10 are provided with opposed surface portions 32 and 38, respectively, limiting movement of the master jaw 12 toward the chuck face 30.

In accordance with the invention, the soft jaw 20 is provided with a slot 40 in the bottom thereof (see FIG. 3) extending transversely therethrough. This slot is preferably formed by broaching so that it is rectangular in cross-section and has a flat top surface or ceiling 42 which is parallel to the face 30 of the chuck body 11 (see FIG. 4). As best shown in FIG. 5, the slot 40 is located approximately midway of the length of the soft jaw 20 and overlies and is the same width as the key-way 24 thereof.

There is provided means for frictionally locking the master jaw and the soft jaw unit in a fixed position relative to the chuck body 11. To the end, there is provided a key-like block 44 mounted in the transverse slot 40. The block 44 has a sliding press fit in contact with the sidewalls of the slot 40, the fit being like a key in a keyway while permitting movement of the block 44 in the slot 40. Block 44 is also received in keyway 24 of master jaw 12 and fits therein like a key in a keyway whereby block 44 maintains a fixed relationship between the soft jaw 20 and the master jaw 12 along an axis perpendicular to the axis wherein the jaws are maintained in a fixed relationship by longitudinally extending key 22 and keyway 23.

The block 44 is of a length such that it has portions extending laterally from the sidewalls of the soft jaw 20 in generally parallel relation to the chuck face 30 as is best shown in FIG. 4. There are provided a pair of leg members 46 extending from the extended portions of the block 44 towards the chuck face 30 for frictionally engaging the same at their lower ends. The leg members 46 comprise screw means threadedly mounted in threaded bores 48 in the extended portions of the block 44 so that rotation thereof in the threaded mounting therefor causes movement of the leg members 46 toward or away from the chuck face 30 as desired.

In accordance with the invention, there are provided actuating means causing the ends 47 of the leg members 46 to come into frictional engagement with the chuck face 30 and to cause the soft jaw 20 to move away from said chuck face 30 to cause the opposed surface portions 32 and 38 of the master jaw and the ways to be frictionally engaged so that the master jaw and soft jaw unit is frictionally locked in a fixed position relative to the chuck body 11. This actuating means includes means on each of the leg members 46 for causing rotation thereof, i.e., the head of each screw means, these heads being formed to be engaged by an Allenhead wrench. Also, it will be apparent that the head of the screw-type leg members could be manually turned if desired.

The actuating means also comprises a screw member 50 threadedly mounted in a threaded bore 52 in the soft jaw 20 in an arrangement so as to engage the top wall of the block 44 at a location in the center of the transverse slot 40 by extending through the ceiling 42. The screw member 50 is movable, by rotation thereof, into contact with the block 44 to cause the same to move in the transverse slot 40 toward the chuck face 30 so that the ends 47 of the leg members 46 are caused to frictionally engage the chuck face 30 and, also to cause movement of the soft jaw 20 away from the chuck face 30 to thereby cause the opposed surface portions 32 and 38 of the master jaw 12 and the chuck ways 18 to become frictionally engaged so that the master jaw and soft jaw unit is frictionally locked in a fixed position relative to the chuck body 11.

In the use of the embodiment of the invention the screw-type leg members 46 are initially adjusted to a position wherein the ends 47 thereof are close to being in contact with the chuck face 30. The soft jaw 20 is then secured into the desired position by turning the screw member 50 to move in bore 52 toward the chuck face 30 and into slot 40 through the ceiling 42. As the screw member 50 moves into passageway 40 it contacts the top wall of block 44 and moves the block 44 downwardly toward the chuck face 30 until the ends 47 of screw members 46 come into contact with the chuck face 30. Continued rotation of screw member 50 in the same direction then causes the soft jaw 20, and the master jaw 12 secured thereto, to be moved away from the chuck face 30, which movement causes the opposed surface portions 32 and 38 of the master jaw 42 and the chuck ways 18 to become frictionally engaged. The rotation of the screw member 50 is continued until the master jaw and the soft jaw unit is frictionally locked in a fixed position relative to the chuck body 11. The same procedure is carried out for each of the soft jaw and master jaw units shown in FIG. 1 whereby the three units are all secured in a fixed or "positive" position in preparation for the machining of the soft jaws 20. Accordingly, when the three soft jaws 20 are machined, the resulting machining operation will provide on the soft jaws 20 workpiece engaging surfaces which are accurately concentric relative to one another. FIG. 1 shows the soft jaws 50 after a typical machining operation thereof has been completed and in position to receive a workpiece. As shown in the drawings the soft jaws 20 have been machined at two diameters to form a stop for the end of the workpiece to be held thereby.

The above-described mode of use of the embodiment shown in FIGS. 1–5 has the advantage that each time it is desired to release the soft jaw, only one part, i.e., screw member 50, has to be turned. However, it should be noted that the setting of the soft jaw and master jaw unit could also be achieved without the use of the center screw member 50 and the locking operation could be achieved by operating the leg members 46 alone. In this case, the two leg members 46 are rotated in a direction to cause the ends 47 thereof to move toward the chuck face 30. After these ends 47 come into contact with the chuck face 30, continued rotation thereof in the same direction will cause the block 44 to slide in the slot 40 toward the ceiling 42 thereof. After the top wall of the block 44 comes into contact with the ceiling 42 of slot 40 (or possibly center screw member 50), continued rotation of the leg members 46 in the same direction described above causes the soft jaw 20, and the master jaw 12 secured thereto, to move away from the chuck face 30 whereby the master jaw 12 will move so as to bring the opposed surface portion 32 and 38 of the master jaw 12 and the chuck ways 18 into frictional contact as shown in FIG. 4. The rotation of leg members 46 is continued until the master jaw and soft jaw unit is frictionally locked in a fixed position relative to the chuck body 11.

What is claimed is:

1. In a lathe chuck having a master jaw guided for sliding movement relative to a chuck body in ways in the chuck body extending radially to a chuck axis by a jaw setting means of a lathe to a workpiece holding position, and a soft jaw mounted on and secured to the master jaw for conjoint movement therewith as a unit, the master jaw and the soft jaw being mounted for movement across a face of the lathe chuck as the master jaw slides in the ways, the ways and the master jaw having opposed surface portions limiting movement of the master jaw toward the chuck face, the improvement comprising:

a slot in the bottom of the soft jaw extending transversely therethrough, and means for frictionally locking said master jaw and soft jaw unit in a fixed position relative to the chuck body including a block mounted in said transverse slot, said block having portions extending laterally from sidewalls of the soft jaw in generally parallel relation to the chuck face, leg members having ends extending from said extended portions of said block towards the chuck face for frictionally engaging the same at the ends of said leg members, and actuating means for causing the ends of said leg members to come into frictional engagement with the chuck face and said soft jaw to move away from said chuck face to cause said opposed surface portions of said master jaw and the ways to be frictionally engaged so that said master jaw and soft jaw unit is frictionally locked in a fixed position relative to the chuck body, wherein said leg members are threadedly mounted in said extended portions of said block so that rotation thereof in said threaded mounting causes movement of the leg members toward or away from the chuck face.

2. The improvement in a lathe chuck as recited in claim 1 wherein said actuating means comprises means on each of said leg members for causing rotation thereof and movement of the ends of said leg members into frictional engagement with the chuck face.

3. The improvement in a lathe chuck as recited in claim 2 wherein said actuating means comprises a screw member threadedly mounted in said block and adapted to engage the block in said transverse slot, said screw member being movable into engagement with said block to cause the same to move in said transverse slot toward said chuck face so that the ends of said leg members frictionally engage the same and to cause said soft jaw to move away from said chuck face.

4. The improvement in a lathe chuck as recited in claim 1 wherein said actuating means comprises a screw member threadedly mounted in said block and adapted to engage the block in said transverse slot, said screw member being movable into engagement with said block to cause the same to move in said transverse slot toward said chuck face so that the ends of said leg members frictionally engage the same and to cause said soft jaw to move away from said chuck face.

5. In a lathe chuck having a master jaw guided for sliding movement relative to a chuck body in ways in the chuck body extending radially to a chuck axis by a jaw setting means of a lathe to a workpiece holding position and a soft jaw mounted on and secured to the master jaw for conjoint movement therewith as a unit, the master jaw and the soft jaw being mounted for movement across a face of the lathe chuck as the master jaw slides in the ways, the ways and the master jaw having opposed surface portions limiting movement of the master jaw toward the chuck face, the improvement comprising:

a slot in the bottom of the soft jaw extending transversely therethrough and defining a ceiling wall extending in generally spaced apart parallel relation to the chuck face, and means for frictionally locking said master jaw and soft jaw unit in a fixed position relative to the chuck body including a block mounted in said transverse slot for slidable movement toward and away from said ceiling wall thereof, said block having portions extending laterally from sidewalls of the soft jaw in generally parallel relation to the chuck face, leg members having ends extending from said extended portions of said block toward the chuck face for frictionally engaging the same at the ends of said leg members, and actuating means for causing movement of the ends of said legs into frictional engagement with the chuck face and movement of said soft jaw away from said chuck face to cause said opposed surface portions of the master jaw and the ways to be frictionally engaged so that said master jaw and soft jaw unit is frictionally locked in a fixed position relative to the chuck body, wherein said leg members are threadedly mounted in said extended portions of said block so that rotation thereof in said threaded mounting causes movement of the leg members toward or away from the chuck face.

6. The improvement in a lathe chuck as recited in claim 5 wherein said actuating means comprises means on each of said leg members for causing rotation thereof and movement of the ends of said leg members into frictional engagement with the chuck face.

7. The improvement in a lathe chuck as recited in claim 6 wherein said actuating means comprises a screw member threadedly mounted in said block and adapted to engage the block in said transverse slot, said screw member being movable into engagement with said block to cause the same to move in said transverse slot toward said chuck face so that the ends of said leg members frictionally engage the same and to cause said soft jaw to move away from said chuck face.

8. The improvement in a lathe chuck as recited in claim 5 wherein said master jaw has a slot-like keyway formed in the top thereof aligned with said slot in the bottom of said soft jaw, said block having a key-like configuration and being received in said slot-like keyway for keying the soft jaw's position relative to the master jaw.

* * * * *